United States Patent Office 2,999,051
Patented Sept. 5, 1961

2,999,051
METHODS OF PRODUCING l-TRYPTOPHANE
Bernard Malin, Indianapolis, Ind., assignor to Eli Lilly and Company, Indianapolis, Ind., a corporation of Indiana
No Drawing. Filed Feb. 6, 1957, Ser. No. 638,456
8 Claims. (Cl. 195—29)

This invention relates to a novel fermentative process of producing *l*-tryptophane. More particularly, it relates to a method of producing uncombined *l*-tryptophane from indole by fermentative means to provide *l*-tryptophane in a form suitable for nutritional use.

*l*-Tryptophane is an essential amino acid and is required by higher animals for growth and development. Swine and fowls have in particular high growth requirements for *l*-tryptophane. Corn and other common feedstuffs lack a sufficient content of *l*-tryptophane to provide the minimum requirements for growth of hogs and fowl, and an inexpensive source of this amino acid for supplementing hog and chicken rations has long been needed. The *l*-tryptophane produced by the process of this invention can be used as a feed ration additive to provide the supplementary amounts of *l*-tryptophane required.

Fermentation methods have been used in the past to produce many essential nutrients in commercial amounts. However, while it has been known that indole could be biosynthetically converted to *l*-tryptophane by highly specialized techniques such as by means of replacement cultures of microorganisms or by using a washed cell biosynthetic technique, the known toxicity of both indole and *l*-tryptophane for most microorganisms during both their growth and metabolic phases, has discouraged attempts to develop a fermentation method for converting indole to *l*-tryptophane. Furthermore, the *l*-tryptophane produced by the biosynthetic methods heretofore known was generally combined in some way with other amino acids in the form of cellular components, and required hydrolytic or other procedures for recovery, with a consequent low yield and racemization of the naturally formed *l*-tryptophane.

It is an object of this invention to provide a commercially feasible biosynthetic method for converting indole to readily recoverable *l*-tryptophane utilizing submerged culture fermentation techniques, and using specially selected strains of microorganisms. It is also an object of this invention to provide *l*-tryptophane concentrates produced by fermentative means and to provide animal feed supplements containing such concentrates.

In accordance with the above and other objects, I have provided a fermentation method for converting indole in high yield to recoverable *l*-tryptophane in uncombined form. For my novel process I utilize microorganisms of the sub-phylum Fungi which can tolerate certain indole and *l*-tryptophane concentrations, and which can continuously convert indole into cell-free *l*-tryptophane during their metabolic phases.

In my novel process, the indole utilized during the progress of the fermentation is incrementally replaced, so as to maintain an indole concentration which is below the toxic level for the particular microorganism employed, but yet is sufficiently great to permit production of *l*-tryptophane on a commercial scale. A particular advantage of my novel process is that the *l*-tryptophane produced accumulates in uncombined extracellular form in the fermentation broth, from which it can readily be isolated, without recourse to hydrolytic procedures.

Generally speaking, my novel process is carried out as follows: A suitable sterile culture medium is inoculated with a sporulative or vegetative culture of the selected indole-converting *l*-tryptophane-producing strain of a microorganism. Preferably fermentation under submerged culture conditions is carried out for an initial predetermined period of time. Indole is then added to the fermentation medium at a subtoxic concentration and the fermentation is allowed to proceed under the initial conditions. The fermentation medium is aerated and stirred during its entire course. As the indole is utilized, a fact which can be determined by a simple color test, more indole is added, so that its concentration is maintained at levels subtoxic to the organism. The *l*-tryptophane accumulates in the extracellular liquid during this entire period. After fermentation has continued for several days, the rate of uptake of indole decreases to the point where further fermentation becomes impractical. The fermentation is then terminated and the *l*-tryptophane present is harvested from the cell-free culture broth by conventional means, as, for example, adsorption techniques, or by immiscible solvent extraction.

In carrying out my novel fermentation, the selected strain of a microorganism of the sub-phylum Fungi preferably is allowed to grow for about twenty-four hours in the liquid culture medium before adding any indole. However, longer initial growth periods, even as high as 60–72 hours, are fully operative. More efficient and more rapid conversion of indole to *l*-tryptophane is usually obtained if the organism is allowed to grow initially for about a day in the absence of indole, but, if desired, an amount of indole can be added at the beginning of fermentation.

In carrying out my novel fermentation, usually an amount of indole is added to the fermentation medium after the initial growth period. Ordinarily, the indole is added in an amount sufficient to produce a concentration of about 0.01 percent since this level has been found to be compatible with both maximal *l*-tryptophane conversion and good growth of the organism. This added indole is generally converted to *l*-tryptophane in about two hours by the microorganism, and a second increment of indole of equal weight is added which is also used up over a slightly longer period of time, and so forth, until the time necessary for conversion of the said added amount of indole to *l*-tryptophane is lengthened to over about twenty hours. This extended conversion period generally occurs at about 4–6 days from the start of the fermentation, or 3–5 days from the first addition of indole when the preferred process is employed. About ten increments of indole are conveniently added during a 4–6 day fermentation period, but if desired, smaller increments of indole can be added at more frequently occurring intervals, or continuous addition of indole solutions can be employed. The efficiency of conversion of indole to *l*-tryptophane is above 65 percent; thus owing to the greater molecular weight of tryptophane, at least one gram of *l*-tryptophane is usually present at the termination of the fermentation for each gram of indole added during the fermentation. Depending on the amount of indole added, a final concentration in the culture broth of *l*-tryptophane of about 1.5 mg./ml. or higher is obtainable.

If the selected microorganism is grown in a synthetic medium, the particular nutritional requirements of the organism must be met. It is well known that these differ somewhat from organism to organism, and the most efficient medium can be found by methods known to the art. For reasons of economy, I employ a "natural" culture medium such as corn steep liquor, or a medium containing corn steep solids. As is well known, however, even with such heterogeneous media, certain nutrients, as for example, salts or vitamins, must often be added to obtain good growth of the particular organism.

In addition, during the course of the fermentation it is usually necessary to replace certain nutrients such as the carbohydrate, in order to maintain the initial rate of indole conversion. Customarily dextrose is added for this purpose. It may also be necessary, during the course of the fermentation, to adjust the acidity of the medium so as to maintain said acidity within an optimal range for the fermentation, and this can be done in the usual way by the use of buffers or by addition of acid or base as required. Furthermore, as is customary in fermentative procedures sterility must be maintained throughout the course of the fermentation.

The temperature at which the fermentation is carried out may vary from about 25 to 32° C., but preferably is kept at about 26° C. As is well known, a particular organism employed may have optimal growth at temperatures somewhat different from that specified. Adjustment of the acidity or temperature, maintenance of sterility, addition of nutrients including carbohydrates or oxygen, etc. are all well known to those acquainted with the fermentation art and do not, in detail, form a critical aspect of this invention.

After the fermentation has been terminated, the mycelium is removed from the broth and the *l*-tryptophane is recovered therefrom by processes well known to the art as for example by adsorption of the tryptophane on adsorbing agents, followed by elution with solvents, and by solvent extraction procedures alone or in combination. A particularly useful procedure is that of a separation employing active carbon as an adsorbent. U.S. Patent No. 2,416,956, issued March 4, 1947, discloses such a method for isolation of tryptophane from mixtures of amino acids as obtained by protein hydrolysis. In the instant procedure, however, the method employed in that patent can be somewhat simplified because interfering amino acids are not present in the filtration broth provided by the fermentation procedures of this invention.

In carrying out my invention, in which indole is continuously converted to *l*-tryptophane, it is necessary to use selected strains of microorganisms, belonging generally to the sub-phylum Fungi. They are found within the following classes: Ascomyceta, Basidiomyceta, Fungi Imperfecti and Phycomyceta, using the classification scheme of G. W. Martin, Outline of the Fungi, Wm. C. Brown Co., Dubuque, Iowa, 1946, 1950. Fungi of the above sub-phyla can be found in nature in soils, on higher plants which they parasitize or growing separately as is the case with the highly organized fungi of the class Basidiomyceta. Generally speaking, species of the above-named microorganisms can be obtained from culture collections such as the American Type Culture Collection, Washington, D.C. After obtaining any particular microorganism, known or unknown, as an isolate, it is grown and maintained on agar slants in the customary way. The suitability of any Fungi isolate for carrying out the fermentative process of this invention is determined as follows by methods well understood in the art: To determine whether a particular microorganism can tolerate concentrations of indole in the range required in the process of invention, liquid nutrient culture media are prepared in the usual manner and are inoculated with a strain of the microorganism under test. A suitable culture medium has the following composition: 0.4 percent ammonium sulfate, 0.882 percent potassium dihydrogen phosphate, 1.14 percent disodium hydrogen phosphate monohydrate, 0.15 percent glycine, 2 percent dextrose, and 0.5 percent corn steep solids. The inoculated culture media are incubated at about 26° C., under aerobic conditions as by shaking, for about twenty-four hours, and then an amount of indole sufficient to bring the concentration of indole in the culture medium to about 0.01 percent is added thereto. The culture medium is then again incubated for a further period of about forty-eight hours. At the end of that time the medium is inspected to determine whether growth of the microorganism has continued after addition of the indole, in comparison with an identically inoculated and incubated control medium to which no indole has been added. Conveniently, the turbidity of the culture medium is measured before and after addition of indole and continued incubation, as by means of a photoelectric nephelometer, increased opacity being taken as sign of growth. To determine whether the microorganism will tolerate *l*-tryptophane, the same procedure is carried out except that an amount of *l*-tryptophane is added thereto sufficient to make its concentration in the culture medium about 0.1 percent. Alternatively, the Fungi isolate is suspended in normal saline solution and inoculated into a culture medium having the composition set forth above and contained in a suitable flask. The flask is placed in a shaker, thus providing for aeration of the growing culture, and the microorganism is allowed to grow for about twenty-four hours. At this time, indole is added at a level of about 50γ per ml., or about 0.005 percent w./v. The presence of indole in the medium is detected colorimetrically employing the Van Urk color test. If the first amount of added indole disappears as shown by failure to obtain a positive Van Urk indole test result with an aliquot, the cell-free fermentation broth is tested qualitatively for the presence of *l*-tryptophane by means of two dimensional paper chromatography using ninhydrin as a color reagent to detect the presence of *l*-tryptophane. If the qualitative test for the presence of *l*-tryptophane is positive, a second batch of indole is added, and if desired, after a negative indole test result is again obtained, a third batch of indole and so forth until the rate of disappearance of the indole slows down. After fermentation is discontinued, the cell-free broth is assayed microbiologically for the presence of *l*-tryptophane. While certain microorganisms are more efficient than others in converting indole to *l*-tryptophane, those microroganisms which will convert two successive increments of 0.005 percent indole to *l*-tryptophane before senescence of the microorganism ensues, can be used in my novel process.

Microorganisms of the sub-phylum Fungi suitable for the purposes of this invention are those which are selected on the basis of the above tests. Among the microorganisms of the sub-phylum Fungi which have been found to be useful for the purpose are members of the genus Chaetomium and Claviceps of the class Ascomyceta, of the genus Cladosporium of the class Fungi Imperfecti, of the genus Rhizopus of the class Phycomyceta and of the genus Ustilago of the class Basidiomyceta. Strains of the following identified species have been found to be useful in converting indole to *l*-tryptophane by the process of this invention: *Claviceps purpurea*, NRRL 2583; *Rhizopus oryzae*, NRRL 1526; and *Ustilago avenae*, ATTC 10056. Strains of the above genera which have not been subjected to a complete morphological characterization so as to identify them with specific strains heretofore known as for example Cladosporium species, Rhizopus species, Chaetomium species, Mucor species, etc. have also been found useful for the above purpose. Such strains have been deposited with the Northern Regional Research Laboratories Culture Collection and are available under the following NRRL numbers: 2669 and 1526. This invention is neither limited to any one species of Fungi nor does it include every strain of any given species. On the other hand, every strain of Fungi which satisfies the criteria set forth above and which therefore can be used for the microbiological production of *l*-tryptophane, comes within the scope of the invention.

The *l*-tryptophane produced by the process of the invention can be isolated and purified by methods well known to the art as hereinbefore indicated. Alternatively, however, when the *l*-tryptophane is to be used as a feed supplement, the fermentation broth can be dried down either with or without prior filtration and added directly to feed as a concentrate. In such case, the amount of *l*-tryptophane present is determined by a microbiological assay method specific for *l*-tryptophane and utilizing the organism *Lactobacillus arabinosus*. This assay method follows the methods of Green and Black, Journal of Biological Chemistry 155: 1 (1944), and Snell and Wright ibid 139:675 (1941). Certain precautions and modifications of this assay are necessary when it is applied to the determination of *l*-tryptophane in the present system. In the first place, indole and anthranilic acid interfere with the assay, and if they are found to be present by color test, they must be removed by toluene extraction of the filtered fermentation broth. On the other hand, the complex hydrolysis procedures of the cited assay methods are omitted, since only uncombined, extracellular *l*-tryptophane in the broth is assayed. The assay is based on the amount of nicotinic acid produced by the *L. arabinosus* fermentation of an aliquot of the unknown broth containing free *l*-tryptophane when compared with the amount of nicotinic acid produced by identical *L. arabinosus* fermentations containing known and graded quantities of added *l*-tryptophane.

The microbiological production of uncombined and readily recoverable *l*-tryptophane by the fermentation of added indole, employing selected strains of Fungi, is further illustrated by the following specific examples.

EXAMPLE 1

Conversion of indole of *l*-tryptophane by *Claviceps purpurea* using a synthetic fermentation medium.

A vegetative culture of *Claviceps purpurea*, strain C–IM (NRRL 2583), was introduced under sterile conditions into a 40-liter fermentation tank containing 20 liters of a fermentation medium having the following composition:

| | |
|---|---|
| Disodium hydrogen phosphate dodecahydrate | 0.508 percent. |
| Ammonium sulfate | 0.2 percent. |
| Potassium dihydrogen phosphate | 0.294 percent. |
| Calcium chloride | 0.01 percent. |
| Magnesium sulfate | 0.05 percent. |
| Ferrous sulfate heptahydrate | 0.001 percent. |
| Biotin | 0.1 mcg. percent. |
| Dextrose | 2.0 percent. |
| Glycine | 0.15 percent. |
| Distilled water, q.s. to make 20 liters. | |

The fermentation was carried out at 26° C. and at a pH of about 6.4–6.5, with constant aeration and agitation. Forty-eight hours after the initiation of the fermentation, a solution of 2 g. of indole in 125 ml. of 95 percent ethanol and 375 ml. of distilled water was added to the tank under sterile conditions. This addition was repeated at 70 hours, at 96 hours, and at 120 hours. Prior to each addition, it had been determined by means of a Van Urk color test that the level of indole in the fermentation was substantially zero. The fermentation was stopped 146 hours after inoculation. The final volume was 12 liters. *L. arabinosus* assay of an aliquot of the fermentation showed the presence of *l*-tryptophane in amount of 500 mcg./ml., with the result that a total of 6 g. of tryptophane was produced from 8 g. of added indole.

A second fermentation was run as above but substituting 0.5 percent of a hydrolyzed casein (such as N.Z. Amine manufactured by the Sheffield Farms Division of the National Dairy Products Corporation) for glycine and adding three successive 2 g. increments of indole. The final yield of *l*-tryptophane was 4.88 g.

A third fermentation was run as above without any added glycine and with a total of 4 g. of indole added in two 2 g. batches, resulting in a yield of 3.98 g. of *l*-tryptophane.

A fourth fermentation was carried out as above but using 0.5 percent of hydrolyzed casein in place of glycine and adding a solution containing 6 g. of indole in 10 ml. of ethanol dropwise over the entire course of the fermentation. *L. arabinosus* assay of the broth showed the presence therein of 7.9 g. of *l*-tryptophane.

EXAMPLE 2

Conversion of indole of *l*-tryptophane by *Claviceps purpurea* using a semisynthetic fermentation medium.

A vegetative culture of *Claviceps purpurea*, strain C–IM (NRRL 2583), was introduced under sterile conditions into a 40-liter fermentation tank containing 20 liters of an aqueous fermentation medium having the following constitution:

| | |
|---|---|
| Ammonium sulfate | 0.2 percent. |
| Potassium dihydrogen phosphate | 0.882 percent. |
| Disodium hydrogen phosphate dodecahydrate | 1.524 percent. |
| Calcium chloride | 0.01 percent. |
| Magnesium sulfate | 0.05 percent. |
| Dextrose | 2.0 percent. |
| Ferrous sulfate heptahydrate | 0.001 percent. |
| Biotin | 0.01 mcg. percent. |
| Glycine | 0.15 percent. |
| Corn steep solids | 0.5 percent. |
| Water, q.s. to make 20 liters. | |

The fermentation was carried out at 26° C. and a pH of about 6.4–6.5. Forty-eight hours after the start of the fermentation one gram of indole, dissolved in 50 ml. of 95 percent ethanol and 75 ml. of distilled water, was added. At intervals thereafter, the fermentation broth was tested using the Van Urk method and when a negative test for indole was the result, a similar addition was made. In this way, a total amount of 6 g. of indole was added. The fermentation was discontinued after 96 hours. The amount of uncombined *l*-tryptophane present was found to be 300 mcg./ml. indicating a total yield of 6.3 g. of *l*-tryptophane.

EXAMPLE 3

Conversion of indole to *l*-tryptophane by *Claviceps purpurea* using a semisynthetic fermentation medium.

A fermentation medium was prepared having the following composition:

| | Percent |
|---|---|
| Ammonium sulfate | 0.4 |
| Potassium dihydrogen phosphate | 0.882 |
| Disodium hydrogen phosphate dodecahydrate | 1.14 |
| Glycine | 0.15 |
| Dextrose | 2.0 |
| Corn steep solids | 0.5 |
| Tap water, q.s. to make the volume desired. | |

Twenty liters of the above fermentation medium was placed in a 40-liter fermentation tank. The tank was inoculated with a vegetative culture of *Claviceps purpurea* (C–IM strain) under sterile conditions, and the fermentation was carried out at 26° C. with aeration. Two grams of indole were added to the fermentation broth at the following times after initation of fermentation: 26 hours, 44 hours, 50 hours, 66 hours, 74 hours, and 96 hours. An additional 2 percent of dextrose (400 g.) was added 26 hours after the start of the fermentation. When the fermentation was discontinued 160 hours after its start, the *l*-tryptophane level was 677 mcg./ml. A total yield of 13.4 g. of *l*-tryptophane was therefore produced from 12 g. of indole.

In a second fermentation similar to the above, 2 g. portions of indole were added at 26, 34, 43, 46, 58, 68, 82, 104 and 105 hours after the start of the fermentation. One percent (200 g.) and 1.5 percent (300 g.) by weight of dextrose were aded at 26 and 104 hours, and the final level of *l*-tryptophane was 950 mcg./ml. In the fermentation, 20.9 g. of *l*-tryptophane were produced from 18 g. of added indole.

In a third fermentation run carried out as above but using 500 ml. Erlenmeyer flasks each containing 250 ml. of medium and a reciprocal shaker in place of the aerated fermentation tank, a final level of 1.5–1.6 mg./ml. of *l*-tryptophane was achieved and 154 mg. of *l*-tryptophane were produced from 105 mg. of added indole, the conversion thus being 83 percent of theoretical based on the amount of indole added.

Results of other fermentations run in substantially identical fashion are summarized in the following table:

Table I

| No. of fermentation | Hour of addition of 2 g. batches of indole | Hour of addition of supplementary dextrose and amount | Length of fermentation, hours | Final level of l-tryptophane, mg./ml. | Amount of l-tryptophane produced/indole added |
|---|---|---|---|---|---|
| 4 | 27, 35, 43, 50, 59, 67, 75, 83, 104, 128 | 2% at 27, 50, 75 | 162 | 1.189 | 24 g./20 g. |
| 5 | 27, 35, 43, 50, 57, 67, 75, 83, 104, 128 | 2% at 27 | 162 | 1.26 | 25.2 g./20 g. |
| 6 | 13 two-gram additions whenever test for indole was negative. | 2% at 30 | 162 | 1.46 | 30.7 g./26 g. |

EXAMPLE 4

Conversion of indole to *l*-tryptophane by selected species of Fungi.

A fermentation medium was prepared having the following composition:

| | Percent |
|---|---|
| Ammonium sulfate | 0.4 |
| Potassium dihydrogen phosphate | 0.294 |
| Disodium hydrogen phosphate heptahydrate | 0.508 |
| Dextrose | 2.0 |
| Glycine | 0.15 |
| Corn steep solids | 0.5 |

Tap water, q.s. to make the volume desired.

One hundred milliliters of the above medium were placed in each of three 500 ml. Erlenmeyer flasks. One flask was inoculated from a sporulative slant of each of the following organisms:

*Rhizopus oryzae* (NRRL 1526), *Ustilago avenae* (ATCC 10056), and *Cladosporium* species (NRRL 2669).

After allowing the organism to grow for a period of from 60–72 hours while being shaken on a reciprocal shaker at 26° C., 5 mg. of indole were added to each of the flasks. Beginning 16 hours later, the flasks were checked periodically for the presence of indole. Whenever a test showed that all the added indole had been utilized, another 5 mg. amount of indole was added. The testing for the presence of indole and the addition of more indole was continued for each flask until the rate of disappearance of indole had decreased beyond practical limits. At this point the flask was removed from the shaker and the residual indole was extracted by contacting the fermentation medium with toluene. The toluene layer was then removed, concentrated to small volume and the amount of indole present in the residue was determined. In each case, tests of the fermentation medium showed the presence of uncombined tryptophane. The following table shows the results of these fermentations:

Table II

| Name | Time of addition of first batch of indole, hours | Length of fermentation, hours | Amount indole utilized, mgs. |
|---|---|---|---|
| Rhizopus oryzae NRRL 1526 | 72 | 234 | 20 |
| Ustilago avenae ATCC 10056 | 72 | 243 | 15 |
| Cladosporium species NRRL 2669 | 72 | 144 | 10 |

EXAMPLE 5

A fermentation medium was prepared having the following composition:

| | Percent |
|---|---|
| Dextrose | 1.5 |
| Beef extract | 0.5 |
| Hydrolyzed casein | 0.5 |
| Bacto peptone | 0.5 |
| Antifoam agent | 0.01 |

Water, q.s. to make 100 percent.

Forty-four liters of this medium was placed in a 68-liter stainless steel fermenter. The medium was sterilized by heating at about 120° C. for fifteen minutes. Next, 500 ml. of a medium of the same composition as that above but omitting the antifoam agent was prepared, placed in a 2-liter Erlenmeyer flask and sterilized. It was then inoculated with *Claviceps purpurea*, strain C–IM, NRRL 2583. This flask was shaken at a temperature of about 25° C. for about 96 hours and it was then used as an inoculant for the 68-liter seed tank fermentation. After inoculation, this seed tank fermentation was carried out for 35 hours at a temperature of about 25° C. using agitation and aeration, the aeration being at the rate of 1.4 c.f.m. Next, 250 gal. of the following medium were placed in a 350-gal. stainless steel fermenter:

| | Percent |
|---|---|
| Dextrose | 2.0 |
| Glycine | 0.15 |
| Corn steep solids | 0.5 |
| Ammonium sulfate | 0.4 |
| Potassium dihydrogen phosphate | 0.9 |
| Sodium hydrogen phosphate dihydrate | 1.5 |
| Antifoam agent | 0.01 |

Water, q.s. to make 100 percent.

This medium was also sterilized by heating at 120° C. for fifteen minutes. The contents of the said tank were added to a 350-gal. steel fermenter which was stirred and aerated at about 25° C. for 86 hours. The aeration rate was 27 c.f.m. After the fermentation had proceeded for 36 hours, an additional 2 percent of dextrose and 190 g. of indole dissolved in 3 liters of hot water were added. One hundred forty grams of indole dissolved in 3 liters of hot water were added at 48, at 63 and at 72 hours. At 63 hours, 4 liters of 5 percent aqueous sodium hydroxide were also added in order to maintain the pH in the range 5–6. The addition of indole took place in each instance when a toluene extract of of the fermentation beer gave a negative test with para-dimethylaminobenzaldehyde. The final yield of *l*-tryptophane was 1.2 mg. per ml. of broth indicating a conversion rate of indole to *l*-tryptophane of about 80 percent.

EXAMPLE 6

*Preparation of l-tryptophane concentrate.*—Three 20-liter fermentation broths produced by the method of Example 3 were combined, filtered and lyophilized. The amount of dried solid present was 628 g. which contained 4.9 percent of *l*-tryptophane. This dried concentrate was powdered and added to a chicken mash in amount sufficient to give a concentration of 0.1 percent of added *l*-tryptophane in order to supplement the *l*-tryptophane originally present in the chicken feed.

Two 20-liter fermentation broths produced by the method of Example 3 were combined and were lyophilized, yielding 897 g. of solid with a 3.6 percent content of *l*-tryptophane. This lyophilized concentrate was also added to a chicken mash in the same concentration as above in order to supplement the amount of *l*-tryptophane therein.

Chickens fed mashes supplemented as above with a dried-down fermentation concentrate containing uncombined *l*-tryptophane grew normally.

Alternatively, fermentation broths produced by the process of the invention can be concentrated to small volume and employed in liquid or semi-liquid form, by incorporating them into finely divided feed materials in such manner that they are uniformly distributed therein.

EXAMPLE 7

*Preparation of substantially pure l-tryptophane from fermentation broth.*—Sufficient hydrochloric acid was added to 1200 liters of a fermentation broth as provided by Example 5, to adjust the pH of the broth to about 4.8. Twenty-four grams of an activated carbon (such as, for example, Nuchar C-190N), were added to the broth and the resulting mixture was stirred for one hour. The broth was then filtered and the filter cake was washed with distilled water. The filter cake was slurried with water and the water was again separated from the carbon by filtration. Neither the washings nor the filtrates contained any *l*-tryptophane as demonstrated by color test. The carbon filter cake was then eluted with a mixture comprising 840 ml. of n-butanol, 210 ml. of water, 210 ml. of ethanol and sufficient ammonium hydroxide to adjust the pH of the eluant to about pH 9.6–9.7. The elution was carried out by stirring the filter cake with the eluant solution. A filtering aid was added and the mixture was filtered. Concentration of the eluate to a volume of about 32 ml. gave a solution which contained about 9.1 mg. per ml. of *l*-tryptophane. A second eluate using about 250 ml. of the same eluant as above was obtained by stirring the carbon filter cake for forty-five minutes with the eluant solution. Concentration of this eluate to a volume of 21.2 ml. gave a solution which contained about 12.4 mg. of *l*-tryptophane per mil. Two more eluates obtained as above yielded 218 more mgs. of *l*-tryptophane in solution. All tryptophane determinations were made by microbiological assay. The four eluates were combined and were evaporated to dryness leaving the *l*-tryptophane in the residue. This residue was dissolved in 80 percent ethanol and the resulting solution was filtered. The filter cake was washed with hot 80 percent ethanol and the combined filtrate and washings were kept at ambient room temperature for about two hours. At the end of this time crystals of *l*-tryptophane had begun to appear. The crystallization mixture was then cooled to about 0° C. for 18 hours and was thereafter centrifuged. The crystals of *l*-tryptophane were separated from the supernatant solution by decantation. The crystals were washed once with cold 80 percent ethanol. The crystals of *l*-tryptophane were separated from the washings by centrifugation followed by decantation and then were dried in vacuo. Ninety-seven milligrams of substantially pure *l*-tryptophane were obtained by this procedure.

I claim:

1. A process for producing *l*-tryptophane which comprises fermenting an aqueous nutrient medium under submerged aerated conditions by means of an indole-converting *l*-tryptophane-producing strain of a species of organism of the sub-phylum Fungi, of the group consisting of the class Ascomyceta, the class Basidiomyceta, the class Fungi Imperfecti and the class Phycomyceta, adding 0.01 percent by weight of indole to said fermentation, and replacing said indole as it is utilized in the fermentation until an amount of uncombined extracellular *l*-tryptophane substantially in excess of 0.1 percent by weight has accumulated.

2. A process for producing *l*-tryptophane which comprises fermenting an aqueous nutrient medium under submerged aerated conditions by means of an indole-converting *l*-tryptophane-producing strain of a species of organism of the sub-phylum Fungi of the group consisting of the class Ascomyceta, the class Basidiomyceta, the class Fungi Imperfecti and the class Phycomyceta, adding 0.01 percent by weight of indole to said fermentation, and continually replacing said indole as it is utilized in the fermentation until an amount of extracellular *l*-tryptophane substantially in excess of 0.1 percent by weight has accumulated.

3. A process for producing *l*-tryptophane which comprises fermenting an aqueous nutrient medium under submerged aerated conditions by means of an indole-converting *l*-tryptophane-producing strain of a species of organism of the sub-phylum Fungi of the group consisting of the class Ascomyceta, the class Basidiomyceta, the class Fungi Imperfecti and the class Phycomyceta, adding about 0.01 percent by weight of indole to said fermentation, and replacing said indole by batch-wise addition as it is utilized in the fermentation until an amount of extracellular *l*-tryptophane substantially in excess of 0.1 percent by weight has accumulated.

4. A process for producing *l*-tryptophane which comprises fermenting an aqueous nutrient medium under submerged aerated conditions by means of an indole-converting *l*-tryptophane-producing strain of a species of organism of the sub-phylum Fungi of the group consisting of the class Ascomyceta, the class Basidiomyceta, the class Fungi Imperfecti and the class Phycomyceta, adding about 0.01 percent by weight of indole to said fermentation, and replacing said indole as it is utilized in the fermentation until an amount of extracellular *l*-tryptophane substantially in excess of 0.1 percent by weight has accumulated, and then isolating said *l*-tryptophane.

5. The process of claim 1 in which an indole-converting *l*-tryptophane-producing strain of a species of *Claviceps purpurea* is employed.

6. The process of claim 1 in which an indole-converting *l*-tryptophane-producing strain of a species of *Rhizopus oryzae* is employed.

7. The process of claim 1 in which an indole-converting *l*-tryptophane-producing strain of a species of *Ustilago avenae* is employed.

8. The process of claim 1 in which an indole-converting *l*-tryptophane-producing strain of a species of a *Cladosporium* mold is employed.

References Cited in the file of this patent

OTHER REFERENCES

"Jour. of Biol. Chem.," vol. 151 (1943), page 349.

Tatum and Bonner, "Proceedings of the National Academy of Sciences," vol. 30, pp. 30 to 37 (February 1944).

Porter: Bacterial Chemistry and Physiology, 1946, John Wiley & Sons, Inc., pp. 876–877.

Umbreit et al.: Jour. Biol. Chem. 165 (1946), pp. 731–732.

Tyler et al.: Science, 118, July 31, 1953, pp. 132–133.

"Advances in Protein Chemistry," vol. 10 (1955), pp. 40 to 42.